(12) United States Patent
Herzberg et al.

(10) Patent No.: US 7,003,677 B1
(45) Date of Patent: Feb. 21, 2006

(54) METHOD FOR OPERATING PROACTIVELY SECURED APPLICATIONS ON AN INSECURE SYSTEM

(75) Inventors: Amir Herzberg, Ramat Efal (IL); Dalit Naor, Tel Aviv (IL); Eldad Shai, Ramat Efal (IL); Boaz Barak, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/431,067

(22) Filed: Nov. 1, 1999

(51) Int. Cl.
*H04L 9/12* (2006.01)

(52) U.S. Cl. .......................... 713/200; 380/286
(58) Field of Classification Search ............... 713/200, 713/201, 164, 189; 380/277, 286, 30
See application file for complete search history.

(56) References Cited

U.S. PATENT DOCUMENTS

| 6,035,041 A | * | 3/2000 | Frankel et al. | 380/30 |
| 6,185,678 B1 | * | 2/2001 | Arbaugh et al. | 713/2 |
| 6,237,097 B1 | * | 5/2001 | Frankel et al. | 713/180 |
| 6,587,946 B1 | * | 7/2003 | Jakobsson | 713/180 |

OTHER PUBLICATIONS

Canetti et al., "Proactive Security: Long-term protection against break-ins", *CryptoBytes: the technical newsletter of RSA Labs*, vol. 3, No. 1, pp. 1–9, (1997).
Canetti et al., "Maintaining Authenticated Communication in the Presence of Break-ins", *Journal of Cryptography*, pp. 1–39, (1998).
Chow et al., "Networking Randomization Protocol: A Proactive Pseudo–Random Generator", *Proc. 5$^{th}$UNSENIX UNIX Security Symposium*, pp. 55–63, (1995).
Istrail et al., "Implementation of proactive threshold public–key protocol", *Saudi National Labs, Proceeding of the 1998 RSA Data Security Conference*.
Herzberg et al., "Proactive Public Key and Signature Systems", *ACM Security '97*, pp.
Boneh et al. "Efficient Generation of Shared RSA Keys", *Proc. Crypto '97*, pp. 425–539.

* cited by examiner

*Primary Examiner*—Matthew Smithers
(74) *Attorney, Agent, or Firm*—Browdy and Neimark, P.L.L.C.

(57) ABSTRACT

A method for providing a proactive security in proactive operating environment. The proactive operating environment includes a group of proactive servers communicating over a network. Each proactive server ($PS_i$) includes a storage that includes a non erasable part that stores a public, non proactive related, key $V^I_{Start}$. The storage further includes an erasable part for storing private and public data. The proactive server has a discardable one-time private key $S^I_{Start}$ that corresponds to the public key $V^I_{Start}$. The proactive server further has configuration data C. There is further provided a processor for providing a proactive services to applications. The proactive server has a group public proactive key $V_{CERT}$ common to the group of proactive servers and a share $S^I_{CERT}$ of a corresponding private proactive key $S_{CERT}$. The method further includes the steps of invoking initialization procedure for generating restore related information, and invoking a restore procedure for utilizing the public, non proactive related, key $V^I_{Start}$ and the restore related information for restoring the public proactive key $V_{CERT}$.

23 Claims, 3 Drawing Sheets

METHOD FOR OPERATING PROACTIVELY SECURED APPLICATIONS ON AN INSECURE SYSTEM

FIELD OF THE INVENTION

The present invention is in the general field of proactive security system and related applications.

BACKGROUND OF THE INVENTION

Traditional security systems assume that one or more systems are always secure, i.e. are never controlled by the attackers. The model of Proactive Security does not make this assumption. Instead, it considers cases where all components of the system may be broken-into and controlled by an attacker, with restrictions on the number of components broken-into during the same time periods (day, week, . . . ).

Proactive security shows how to maintain the overall security of a system even under such conditions. In particular, it provides automated recovery of the security of individual components, avoiding the use of expensive and inconvenient manual processes (except for some "aggressive" attacks, which cannot be prevented—but are definitely and clearly detected). The technique combines two well-known approaches to enhance the security of the system: distributed (or threshold) cryptograph, which ensures security as long as a threshold (say half) of the servers are not corrupted and periodic, refresh (or update) of the sensitive data (e.g. keys) held by the servers. In short, Proactive=distributed+refresh This way, the proactive approach guarantees uninterrupted security as long as not too many servers are broken at the same time. Furthermore, it does not require identification when a system is broken into, or after the attacker loses control; instead, the system proactively invokes recovery procedures every so often, hoping to restore security to components over which the attacker lost control.

Proactive security is highly desirable in many realistic settings, in particular:

When a high level of security is required, together with fault tolerance (as redundancy improves fault tolerance but opens more points for attack).

To ensure acceptable level of system using weakly secure components such as most commercially available operating systems.

Recent results show that many fundamental cryptographic functionalities may be achieved even under the proactive security model—as long as most components are secure most of the time. In particular, proactively secure protocols have been devised for the following problems (see General Overview in [2]:

Secret sharing

Discrete-log-based digital signatures, and in particular DSA

Secure and end-to-end communication

RSA and in particular generation of the RSA shared key

Pseudo-random generation

Key distribution center

This substantial set of known results in proactive security did not yet produce any practical security product or solution. (In fact, there are only a few developments of distributed security—the most well known may be the SET credit card standard\s certificate authority; see also 'related art' below). The creation of such a proactive solution is non-trivial, as the protocols are often quite complex and nontrivial to implement. Furthermore, the protocols are specified under some simplifying assumptions and do not address some needed elements, such as interfacing between the proactive service and the applications using it.

Applications of the Proactive Security Services

There are three kinds of applications that may take advantage of the proactive security services, as follows:

Centralized applications—a "traditional" application running on one server only. The application uses a proactively secure service provided by the toolkit. For some applications and services, this could provide a significant advantage, at minimal change to existing applications. Some typical applications are:

Secure logging: each client application may add entries (events) to the log; however, none of them can modify or erase the log. This could be of great value in improving intrusion detection tools, as intruders often try to erase traces in log files.

Secure end-to-end communication: the proactive environment can provide the applications with freshly generated and certified public keys periodically. This could be integrated with tunneling mechanisms such as secure IP or SSL.

Timestamping: can be used to sign a document (or its hash) and current time, to prove that the document existed at this time.

Distributed applications—the application runs simultaneously on all servers (App_1 . . . , App_n) and requests services through all servers. Each App I interacts directly with its own proactive server (PS-I). A typical application is a certificate authority, or in general any workflow application requiring secure (multi-person) digital signatures. Another application is key recovery (escrow agents).

Proactive applications—the application runs in a distributed configuration but, in addition, goes through periodical refreshes by utilizing the proactive services. This is required when the application security or efficiency requirements cannot be met by the services. Examples include multiparty protocols such as voting and trading, database, operating system and access control mechanisms. Another application is a Secure Commerce Server—such server cannot lie behind the firewall although it handles confidential data and matters (such as access control, certificates, etc.), it is therefore natural to proactively distribute the server among a number of (independent, and possibly not even mutually trusted) hosts and locations thus achieving increased trust in the server.

Related Art:

REFERENCES

1. D. Boneh and M. Franklin, *Efficient generation of shared RSA keys*. In Proc. Crypto '97, pp. 425–539.
2. R. Canetti, R. Gennaro, A. Herzberg and D. Naor, *Proactive Security: Long-term protection against break-ins*. CryptoBytes: the technical newsletter of RSA Labs, Vol. 3, number 1—Spring, 1997.
3. R. Canetti, S. Halevi and A. Herzberg, "*Maintaining authenticated communication in the presence of break-ins*". To be published in Journal of Cryptography, 1999. An extended abstract of this paper appeared in the Proceedings of the 16$^{th}$ ACM Symp. On Principles of Distributed Computation. 1997
4. C. S. Chow and A. Herzberg. *Network randomization protocol: A proactive pseudo-random generator.* Appears in Proc. 5th USENIX UNIX Security Symposium, Salt Lake City, Utah, June 1995, pp. 55–63.
5. V. Hamilton, G. Istrail—Sandia National Labs, *Implementation of proactive threshold public-key protocols*, Proceedings of the 1998 RSA Data Security Conference.
6. A. Herzberg, M. Jakobsson, S. Jarecki, H. Krawczyk and M. Yung, *Proactive public key and signature systems*, ACM Security '97.

There are a few implementation efforts of proactive algorithms. Specifically, the Network Randomization Protocol (NRP) of [4], which provides a proactive pseudo-random generator, has been implemented at IBM. In the latter it is assumed that there is no global information common to the proactive servers and therefore, obviously, there is no need to restore it after loss or corruption. This assumption poses undue constraint insofar as some commercial applications are concerned.

Another effort, the implementation of proactive threshold key protocols, has been reported in [5].

Whilst there have been efforts to deal with applications where global information is restored in response to loss or corruption they all require to store in a protected environment (e.g. ROM) information that is related to the group of proactive servers. Obviously, this information is not available when the server is manufactured and sold, but only much later—when it is integrated into a specific proactive environment. Accordingly, incorporation of such information requires a relatively sophisticated hardware and is of static nature, meaning that after having incorporated the group related global information in the ROM (or equivalent hardware), the information cannot be altered, if, say, the group members change.

Overview of the Proactive Model and Algorithms
Model

The proactive model described below assumes typically (although not necessarily) the following. A set of n servers (P1, P2 . . . Pn) that are interconnected by complete point-to-point communication channels. Time is divided into periods (like days, weeks . . . ) which are determined by some global clock. An adversary may (temporarily) attach up to t of the n servers at any given time period—but at different time periods, different sets of t servers can be attacked. As a result, all servers engage in a refreshment stage at the beginning of each time period, so that any server which has been attacked during past periods may automatically recover from possible undetected break-ins. Corruption is assumed to be either static (for example, disconnect a server from the rest of the network, eavesdrop, read secret data) or active/malicious (for example, deviate from the protocol, corrupt local data, etc.). Therefore, after the attacker loses control over a server, the attacker may still know secret information of that server (e.g. passwords or secret keys). Furthermore, before losing control, the attacker may have corrupted (modified) some of the server's data (e.g. public keys of certificate authorities). The refreshment stage deals with both aspects, i.e. recovers any corrupted data and invalidates any old secret data (by choosing new secrets or splitting global secrets into a new set of shares). This brings the server back to a running stage, and guarantees that any information that was gathered by the adversary becomes worthless after recovery.

The fact that the attacker is limited to t corruptions, out of n servers, is similar to the distributed (or threshold) security model used many works in distributed computing and cryptography. However, in the proactive security model, the attacker is allowed to corrupt every server—as long as it does not corrupt more than t servers at the same period. The adversary in the proactive model is mobile, namely attacked components may be released at some point due to some security measure or other change in the system or the adversary causing loss of control, often as a result of an attempt by the adversary to avoid detection or the attack). Furthermore, in contrast to other approaches, proactively secure systems do not necessarily wait until a break-in is detected. Accordingly, a proactively secure system may invoke the refreshment protocol periodically (and proactively) in order to maintain uninterrupted security, or force detection. For more discussion on the motivation behind this model, see [2, 3]

Some attacks on the system cannot be prevented. The 'classical' example is if the attacker is breaking into a server, thereby finding all its secret keys; it then pretends to be that server while keeping this server disconnected from the other servers (when the attacker lost control over that server). However, in such cases, the attack can be detected and raise an alert—inform the operator about the attack. Operators will normally respond to such an alert by invoking special emergency security resources and procedures, which are very likely to remove the attacker—and possibly catch her as well. Therefore, it is highly unlikely that (smart) attacker will use such 'visible' attacks.

The proactive security model assumes that even during attack, some specific data cannot be corrupted. The obvious example for data that is assumed not to be corrupted is the program itself; if it could be changed, recovery is clearly impossible. Clearly, the program is not any different than any constant value used by the program; It is assumed that each computer proactive server comes with a read only memory which can specify its contents. Specifically, it is assumed that each computer (proactive server) comes with such a non-erasable storage, e.g., a read only memory (ROM) containing a fixed public key, and the corresponding secret key is known only at initialization as will be explained in greater detail below. This assumption is not too difficult to implement in practice. The characteristics of the specified model are described for clarity of explanation and accordingly those versed in the art will readily appreciate that various alterations and modifications may be applied, all as required and appropriate depending upon the particular application.

There is accordingly a need in the art to provide for an operating environment of a network of servers which are set up once (designated group of protective servers). Each server is instantiated preferably at boot time by the operating system and is checked periodically, also by the operating system. Servers can recover data (both public and private data) from self or other servers in the proactive network, if such data is corrupted or lost. There is a specific need in the art to provide for an initialization and recovery procedures for a proactive operating environment of the kind specified.

SUMMARY OF THE INVENTION

The invention provides for a proactive operating environment that includes a group of proactive servers communicating over a network; each proactive server ($PS_j$) comprising:

a storage that includes a non erasable part that stores at least a public, non proactive related, key $V^j_{Start}$; said storage further includes an erasable part for storing private and public data; said proactive server is further associated with a discardable one-time private key $S^j_{Start}$ that corresponds to said public key $V^j_{Start}$; said proactive server is further associated with configuration data C;

a processor for providing at least proactive services to applications;

the proactive server is associated with a group public proactive key $V_{CERT}$ common to said group of proactive servers and a share $S^I{}_{CERT}$ of a corresponding private proactive key $S_{CERT}$;

the processor is operative to invoke initialization procedure for generating restore related information;

the processor is further operative to invoke a restore procedure for utilizing at least said public, non proactive related, key $V^I{}_{Start}$ and said restore related information for restoring at least said public proactive key $V_{CERT}$.

The invention further provides for a method for providing a proactive security in proactive operating environment; the proactive operating environment includes a group of proactive servers communicating over a network; each proactive server ($PS_I$) comprising:

a storage that includes a non erasable part that stores at least a public, non proactive related, key $V^I{}_{Start}$; said storage further includes an erasable part for storing private and public data; said proactive server is further associated with a discardable one-time private key $S^I{}_{Start}$ that corresponds to said public key $V^I{}_{Start}$; said proactive server is further associated with configuration data C;

a processor for providing at least proactive services to applications;

the proactive server is associated with a group public proactive key $V_{CERT}$ common to said group of proactive servers and a share $S^I{}_{CERT}$ of a corresponding private proactive key $S_{CERT}$; the method further including:

invoking initialization procedure for generating restore related information; and invoking a restore procedure for utilizing at least said public, non proactive related, key $V^I{}_{Start}$ and said restore related information for restoring at least said public proactive key $V_{CERT}$.

Still further, the invention provides for a storage medium storing computer implemented program for providing a proactive security in proactive operating environment; the proactive operating environment includes a group of proactive servers communicating over a network; each proactive server ($PS_I$) comprising:

a storage that includes a non erasable part that stores at least a public, non proactive related, key $V^I{}_{Start}$; said storage further includes an erasable part for storing private and public data; said proactive server is further associated with a discardable one-time private key $S^I{}_{Start}$ that corresponds to said public key $V^I{}_{Start}$; said proactive server is further associated with configuration data C;

a processor for providing at least proactive services to applications;

the proactive server is associated with a group public proactive key $V_{CERT}$ common to said group of proactive servers and a share $S^I{}_{CERT}$ of a corresponding private proactive key $S_{CERT}$; the method further including:

invoking initialization procedure for generating restore related information; and invoking a restore procedure for utilizing at least said public, non proactive related, key $V^I{}_{Start}$ and said restore related information for restoring at least said public proactive key $V_{CERT}$.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

There follows a description of the basic architecture and functional operation of a proactive operation environment in accordance with one embodiment of the invention.

Figure 1:
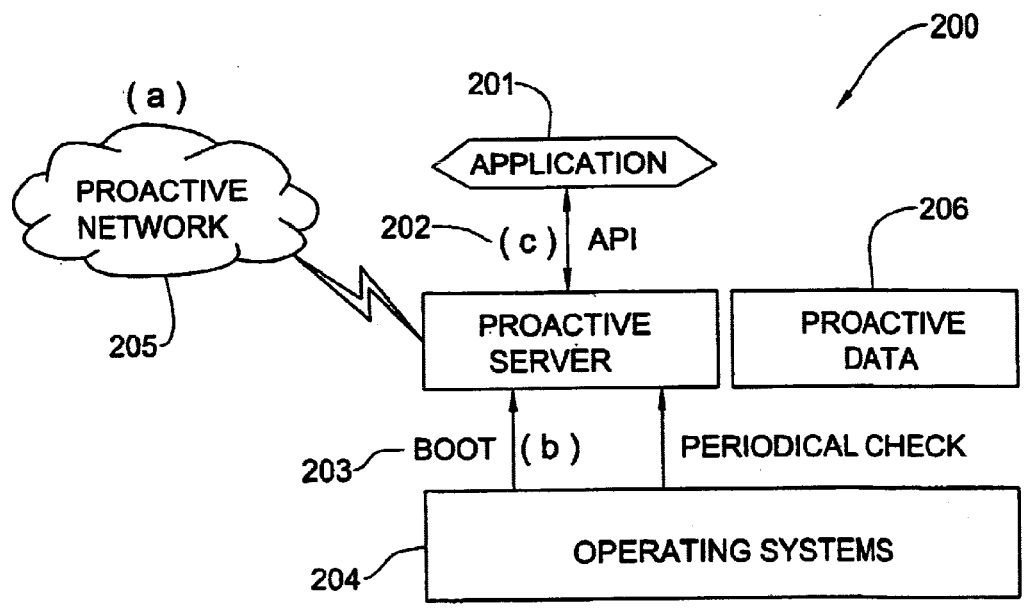
FIG. 1 is a generalized proactive network in accordance with one embodiment of the invention.

Thus, the proactive operating environment includes a network of servers (100) which is set up once—this network is referred to as the Proactive Network, or group of proactive servers (see FIG. 1). Obviously, the network may include other servers which may form part of other proactive group or groups, all as required and appropriate. It should be noted that a server may be a member of two or more groups. Server should not be construed as bound to any specific platform or architecture.

Figure 2:
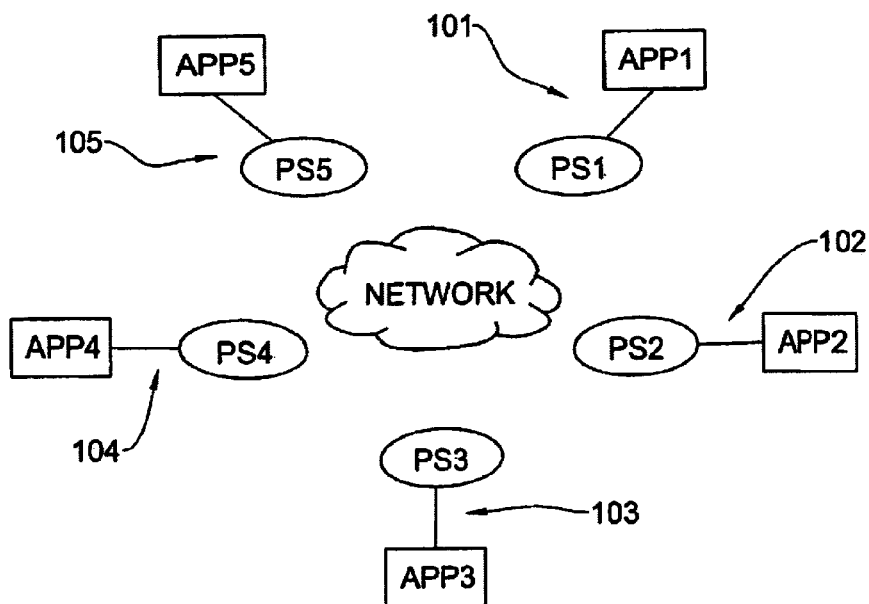
FIG. 2 is a generalized proactive server (PS) architecture in accordance with one embodiment of the invention.

Each node in the network runs a proactive server (Pserver), of which only 5 are shown (101 to 105). The basic, non limiting, architecture of Pserver (200) (in accordance with one embodiment) is depicted in FIG. 2. Thus, a Pserver communicates with other Pservers via the proactive network (205), and provides proactive services to applications (designated generally as (201)) by means of, say, Application Programming Interface (API). A server is initiated at boot time (203) and checked periodically by the operating system (204).

Modules of the Pserver

By a non-limiting embodiment, the internal design of Pserver (200) is composed of the following modules:

The Controller: This is the main "engine" of the program. It manages the Pserver data, dispatches incoming messages to appropriate protocols in the protocols tree, keeps the status of the proactive network (namely, which nodes are active and running).

Communication Module: This module is responsible for the secure transmission and receipt of messages across the proactive network and with the various applications that use the Pserver services.

Library of Proactive Utilities: This library is built upon a standard cryptographic library and is a collection of utilities (objects) that are needed for implementation of proactive algorithms and protocols. It includes, for example, Shamir's secret sharing SS0, Feldman's Verifiable Secret Sharing, Joint Secret Sharing and error-correcting polynomial interpolation. Note that this library concerns preferably functionalities that are needed locally in order to perform the protocols.

Library of Proactive Protocols: A proactive protocol (in contrast to a proactive utility) is a thread of code that is executed at one server and performs the logical flow of communication steps required by a certain protocol, using the proactive utilities library for its local computations. The implementation is based e.g. on a collection of protocols that are executed by the Pservers (either for its proper operation or as a proactive service to other applications). Examples of protocols are all variants of Secret Sharing protocols, as well as the Initialization and Recover Procedures, according to the invention which will be described in greater detail below.

The API Module: A module that provides interface to applications that run over the proactive operating environment.

The Pserver Data

The Pserver, maintains some key internal data. However, the maintenance of these data raises a few algorithmic problems, as the server must be able to refresh and recover itself periodically, and this includes recovering its data or at least verifying that it has not been corrupted. The server's data is one of three types. The specified data are stored in various modules designated generally as storage (206) in FIG. 2, as follows:

1. ROM (or other non-erasable part) data—these "write once" data is assumed to be immutable so that any attack on the system cannot tamper with it, however, an adversary may learn it. It is used for bootstrapping purposes as otherwise a recovering server could not bring itself to a secured state. The design, as detailed below, attempts to minimize the amount of data that must be stored in the ROM in order to safely boot the server; in particular it shows that is suffices to store a public (non proactive related) key, e.g. server's unique identification code or the server's port number in the ROM for the Pserver to be completely recoverable. The invention is, however, not bound by any specific data that are stored in the ROM and likewise not to the public and private data described below.

2. Public data: Parts of this data are common to all servers, but other parts are specified to the particular Pserver, yet its exposure to the entire proactive network does not interfere with the security of a Pserver. Since these data are necessary for the proper operation of any server and thus must be recoverable. The public data are preferably duplicated among all servers so that during recovery the data can be reconstructed if need with the assistance of the proactive network. The details of this process are described below. The public data may be extended during the lifetime of the system, for example by generating new long-lived secrets (the common fields of these long-lived secrets is added to the public information).

3. Private data, specific to a particular server. One such example is the server's share of a private proactive key. These data are typically not recovered, but instead are refreshed. It also requires (e.g. for the one-time private key) the ability to be completely erased from the system without leaving any traces, which is a property that needs to be supported by the operating system.

The Proactive Security opoeration

In accordance with the invention, a proactive operating environment must maintain proactively secure communication among the servers, as well as a proactive internal signature key for the entire lifetime of the system. For that, these two protocols must be initiated and undergo refresh at every period, where a refresh may actually involve recovering in any server if that server had detected that some of its data was corrupted or lost. Publication [3] provides the design of the integrated proactive protocols of signatures and secure communication, and [5, 6] for the specific proactive signature mechanism. However, [3] requires every server to keep in read-only memory (ROM) a copy of the public non-proactive related key Vcert (whose corresponding secret key Scert) is shared between all the proactive servers, and these shares $S_{Icert}(t)$ are refreshed at every period t. This assumption is not very practical, as the public key Vcert (common to the group of proactive servers) is not available when the computer is manufactured and sold, but only much later—when it is integrated into a specific proactive environment. In accordance with the preferred embodiment of the invention, it is shown how to provide the requirements of [3] while requiring only that each computer comes with pre-installed, machine-unique pair of secret key $S^i_{start}$ (e.g. on erasable disk), serving as the one-time private key and public key $V^I_{start}$ (on ROM). It is accordingly appreciated that unlike Vcert, $V^I$start is unique and not group related.

Another practical aspect which has to be dealt with is that the proactive server needs some constants configuration information such as IP addresses of other servers, cryptographic parameters used in the cyrptographic algorithms, and so on. The set of these (public) constants are denoted by C. The proposed protocols include mechanisms to recover C periodically (if the adversary corrupted C when breaking onto the server at the previous period). Let $Mi=[S^I_{start}(V_{cert}, C)]$ be the signature of server I on $(V_{cert}, C)$ using its initial key $S^I_{start}$. M denotes the concatenation of all Mi's, that is $M=(M_1, M_2 \ldots M_n)$. Hence, M is the Invariant Information of the system.

Publication [3] provides a review of the periodical refresh protocol, which assumes the availability of an unmodified Vcert at every proactive server. Typically, although not necessarily, the recover procedure of the invention is invoked when the refresh procedure has encountered loss or corruption of data that needs to be recovered.

Figure 3:
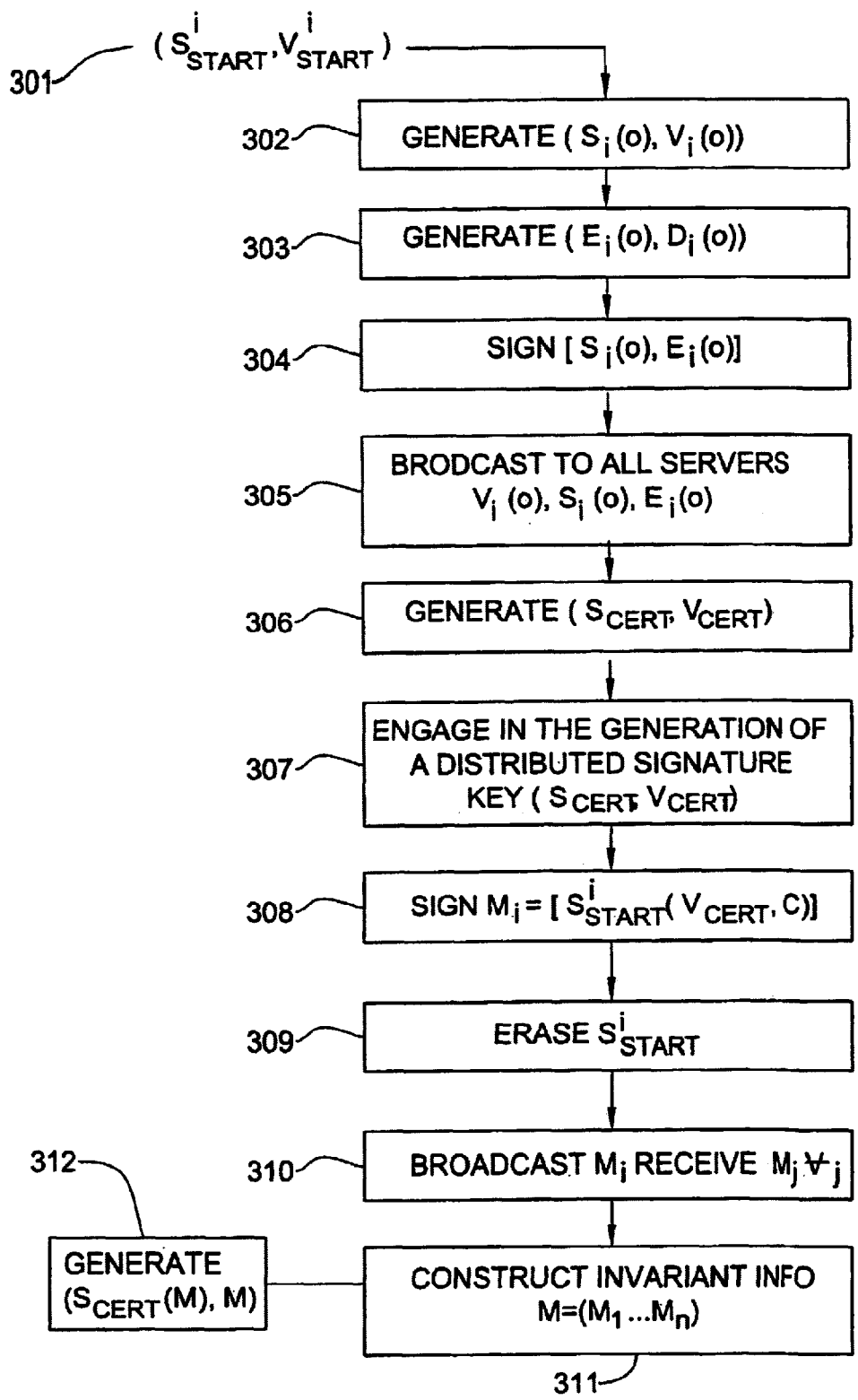
FIG. 3 is a flow chart illustrating an initialization procedure executed by a PS, in accordance with one embodiment of the invention.

The initialization protocol is executed, preferably, at the setup of the system and is described with reference to FIG. 3. The goal is to bring the servers to a state from which they can safely perform the recover module at the refresh stage, if necessary, and accomplish proper operation of the system. To this end, the initialize procedure generate a so called restore related information.

The input to the protocol (i.e. the initialize procedure (301) is the configuration (designated generally as C and $(S^I_{start}, V^I_{start})$, where $V^I_{start}$ is the public non proactive related part of the key stored in the ROM module of the proactive data (206). $V^I_{start}$ is considered non-proactive as it is not group related. Put differently, the same $V^I_{start}$ key may be used for the Pserver #i regardless of the group of proactive servers to which it belongs. $V^I_{start}$ stands, for example, for the PS unique identification code embedded in the ROM during manufacture. $S^I_{start}$ is the corresponding private key which is used once and must be discarded afterwards.

At first (302–305), a set of keys $S_f(0)$, $V_f(0)$, $E_f(0)$, $D_f(0)$ are generated, and all except $D_f(0)$ are broadcast over the network channel to the rest of the servers (1 ... i–1, i+1, ... n), so as to authenticate and encrypt the channel, all as known per se. As is well known the $E_f(0)$, $D_f(0)$ are optional whereas $S_f(0)$, $V_f(0)$ are, as a rule (albeit not always), used.

Next, a pair of keys are generated, i.e. group public proactive key is generated $V_{Cert}$ and a share of the corresponding private key $S_{Cert}$ (306) by a well known procedure (e.g. see [1]) (307) giving rise to $V_{Cert}$ public key common to the group of the proactive servers. $S^I_{Cert}$ is the private secret share of SP (i).

Any message signed by $V_{Cert}$ is assumed to be truly signed by the members of the group.

In the next steps a joint signature ($S_{Cert}$ (M),M) is generated, standing, preferably, for the invariant information to help recovering servers (as will be explained in greater detail below).

To this end, the $V_{Cert}$ public key and the configuration C are signed using the one-time private key $S^I_{Start}$ so as to constitute $M_I$ message (308). In this connection, it should be noted that the configuration C is not bound to any specific contents and may vary, depending upon the particular application. Having generated $M_I$, the one-time private key $S^I_{Start}$ is discarded (309), such that it can no longer be accessed and used by any other node.

$M_I$ is now broadcasted to all, and $M_J$ is received from all respective $SP_J$ (310). Now the InvariantInfo is constructed by concatenating $M_1 \ldots M_N$ (311) and is signed (312) so as to generate the joint signature ($S_{Cert}$ (M), M).

The information generated by the initialize procedure, and which will later be used by the restore procedure, constitutes one form of restore related information (e.g., ($S_{Cert}$ (M),M); $S^I_{start}$ ($V_{cert}$ C).

It should be noted that the restore related information includes a "self" part serving for restoring at least the $V_{cert}$ (and possibly other) info (e.g. the specified $M_I$) of the specified Pserver, and optionally also "others" part (e.g. the $S_{Cert}$ (M),M)) which will assist other servers in the group to recover their respective $V_{cert}$ (and possibly other) info. It should be noted that in the specific example described herein, each server generated "others" info (i.e. M and signed M) which enable any other server in the group to restore its $V_{cert}$ info solely relying on the "others" info of that particular server, since, M is a concatenation of the $M_I$ parts of each one of the other members in the group. Thus, any server which is subject to corrupted or loss of $V_{cert}$ info, will be able on the basis of the verified M received from the specified "other" server to extract its respective $M_I$ and using the $V^I_{Start}$ key stored in its ROM, to construct $V_{cert}$ (and possibly other lost data).

Those versed in the art will readily appreciate that this is not necessarily always the case. Thus, for example, by another embodiment a given Pserver can recover the $V_{cert}$ info on the basis of "others" info received from two or more of the specified group members. In this connection it should be noted, generally, that the unlike the "self" info that is always generated, the "others" info is generated only when required, depending upon the particular application.

Having completed the initialization procedure, the SP is ready for the recovery procedure which may be invoked by the refresh procedure, as described above. The recover procedure utilizes the restore related data generated by the initialization procedure.

At the beginning of every recover, Vcert is regenerated and the constant C is restored for any server which lost these data. As a result, it brings a recovering server to a state from which it can participate in the Refresh protocol described above. It is assumed that any operational server has a valid copy of a signature on M, the Invariant Information of the system, signed by the distributed signature key Scert—an assumption that is supported by the initialization module described above.

Essentially, this protocol allows any recovering server to gather M, the Invariant Information of the system, from other operational servers as long as there are enough of them. Note that M needs to be 'pushed' around the system since a recovering server may not known who its partners are (recall that C, the program constants, contains information such as IP addresses). The protocol is executed by all servers, and by the end of it, a server detects whether it is 'operational' or 'recovering'.

Figure 4:
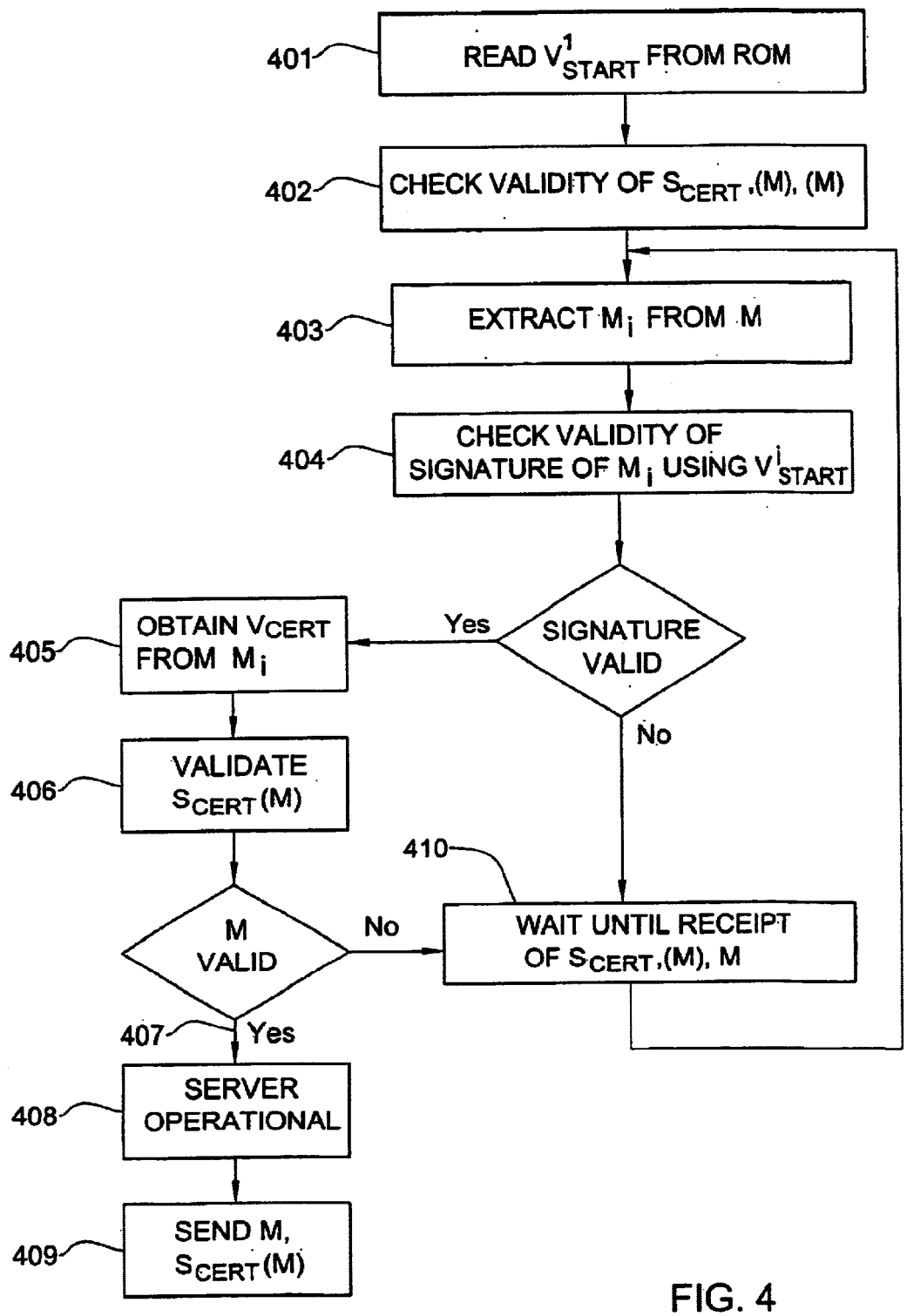
FIG. 4 is a flow chart illustrating a recovery procedure executed by a PS, in accordance with one embodiment of the invention.

Turning to FIG. 4, at first, $V^I_{Start}$ is extracted from the ROM (401). In order to validate the joint signature ($S_{Cert}$ (M), M) (402) the following procedure is invoked. To this end, the $V_{Cert}$ should first be extracted which necessitates to extract $M_I$ from M(403). This can be easily accomplished considering that M is a concatenation of $M_1 \ldots M_N$. Having obtained $M_I$, $V_{Cert}$ is constructed by applying $V^I_{Start}$ (that is available to the recovering SP as it is stored in the ROM) to $M_I$. It is recalled in this connection that $M_I$ consists of $S^I_{Start}$ ($V_{Cert}$, C), and accordingly applying $V^I_{Start}$ thereto will give rise to $V_{Cert}$ (and the configuration C).

Those versed in the art will readily appreciate that by using a unique key a-priori stored in the ROM, the recovering SP is able to restore the $V_{CERT}$ key, which is group dependent (non-proactive related). It is recalled in this connection that according to hitherto known techniques, it was required to maintain the group dependent key for the recovery procedure. This requirement according to the prior are posed undue constraint as it was required to embed during manufacture (or afterwards using dedicated expensive hardware) a group dependent key in each SP, whereas according to the present invention, it is sufficient to embed a unique key $V_{START}$ (say the SP identification code) and therefrom to reconstruct the group dependent key $V_{CERT}$.

Having constructed $V_{CERT}$, (405) the latter is used to validate M by applying $V_{CERT}$ to the joint signature part ($S_{Cert}$ (M)) (406). If the result matches M (which is explicitly included in the joint signature) (407), then the server becomes operational (408). In other words, by validating M, the recovering server has confirmed the validity of all $M_J$ of the respective SPs and consequently has confirmed that each corresponding $SP_J$ is a member in the group. M and $S_{Cert}$ (M) are then sent to all the members (409) allowing each one of them to exploit M for recovering its self $V_{CERT}$.

If, on the other hand, M is invalid (i.e. the application of $V_{CERT}$ in step (406) did not result in M, then the SP await the receipt of another joint signature (410 and 411) and in response repeats steps (403) and onwards until M is validated.

In the claims below, alphabetical letters and roman symbols are used for convenience only and do not necessarily imply any order of the method steps.

The present invention has been described with a certain degree of particularity, but various alterations and modifications may be carried out without departing from the scope of the following claims.

What is claimed is:

1. A proactive operating environment that includes a group of proactive servers communicating over a network; each proactive server ($PS_I$) comprising:

a storage that includes a non erasable part that stores at least a public, non proactive related, key $V^I_{Start}$; said storage further includes an erasable part for storing private and public data; said proactive server is further associated with a discardable one-time private key $S^I_{Start}$ that corresponds to said public key $V^I_{Start}$; said proactive server is further associated with configuration data C;

a processor for providing at least proactive services to applications;

the proactive server is associated with a group public proactive key $V_{CERT}$ common to said group of proactive servers and a share $S^I_{CERT}$ of a corresponding private proactive key $S_{CERT}$;

the processor is operative to invoke initialization procedure for generating restore related information;

the processor is further operative to invoke a restore procedure for utilizing at least said public, non proactive related, key $V^I_{Start}$ and said restore related information for restoring at least said public proactive key $V_{CERT}$.

2. The system according to claim 1, wherein said restore procedure is invoked by refresh procedure.

3. The system according to claim 1, wherein said non erasable part of the storage being a ROM memory module.

4. The system according to claim 1, wherein said applications are at least one of the following:

Secure logging, Secure end-to-end communication, Timestamping, Certificate authority, Key recovery, Voting, Trading, Database, Operating system, Access control mechanisms, Secure Commerce.

5. The system according to claim 1, wherein said restore related information includes restore related self information.

6. The system according to claim 1, wherein said restore related information includes restore related others' information.

7. The system according to claim 5, wherein said restore related self information includes $M_I = S^I_{Start}(V_{Cert}, C)$.

8. The system according to claim 6, wherein said restore related others' information includes $(S_{Cert}(M), M)$.

9. The system according to claim 1, wherein said initialization procedure includes:

(i) input for receiving at least configuration data C, public non-proactive related key $V^I_{Start}$ and discardable one time private key $S^I_{start}$;

(ii) the processor generating a set of keys $S_f(0)$, $V_f(0)$, $E_f(0)$, $D_f(0)$;

(iii) broadcasting said set of keys except $D_f(0)$ over the network to the rest of the servers (1 ... i−1, i+1 ... n) in the group, so as to authenticate and encrypt the network channel;

(iv) the processor generating the group public proactive key $V_{Cert}$ and a share $(S^I_{CERT})$ of corresponding private proactive key $S_{CERT}$;

(v) the processor generating restore related self information that includes $M_I = S^I_{Start}(V_{Cert}, C)$;

(vi) discarding the one-time private key $S^I_{Start}$;

(vii) broadcasting $M_I$ to all servers in the group, and receiving $M_J$ from all respective $SP_J$ servers in the group; the processor concatenating said $M_1 \ldots M_N$ so as to construct M;

(viii) the processor generating a joint signature $(S_{Cert}(M), M)$ that forms part of said restore related others' information; and (ix) broadcasting the joint signature $(S_{Cert}(M), M)$.

10. The system according to claim 1, wherein said recover procedure includes:

(i) the processor extracting $V^I_{Start}$;

(ii) the processor extracting $M_I$ from M;

(iii) the processor constructing $V_{Cert}$ by applying $V^I_{Start}$ to $M_I$;

(iv) the processor validating M by applying $V_{CERT}$ to the joint signature part $(S_{Cert}(M))$; if the result matches M then the server becomes operational; sending M and $S_{Cert}(M)$ to all the group servers;

(v) if, on the other hand, M is invalid, then waiting the receipt of another joint signature and in response repeating said (ii) to (iv).

11. The system of claim 1, wherein an initialize procedure is configured to generate restore related information.

12. The system of claim 1, wherein a restore procedure is configured to utilize at least said public, non proactive related, key $V^I_{Start}$ and said restore related information for restoring at least said public proactive key $V_{CERT}$.

13. A method for providing a proactive security in proactive operating environment; wherein the proactive operating environment includes a group of proactive servers communicating over a network; the method comprising performing the following in respect of each proactive server $(PS_J)$:

storing in a non erasable part at least a public, non proactive related, key $V^I_{Start}$;

storing, in an erasable part private and public data;

providing a discardable one-time private key $S^I_{Start}$ that corresponds to said public key $V^I_{Start}$;

providing configuration data C;

providing at least proactive services to applications;

providing a group public proactive key $V_{CERT}$ common to said group of proactive servers and a share $S^I_{CERT}$ of a corresponding private proactive key $S_{CERT}$;

invoking an initialization procedure for generating restore related information; and invoking a restore procedure for utilizing at least said public, non proactive related, key $V^I_{Start}$ and said restore related information for restoring at least said public proactive key $V_{CERT}$.

14. The method according to claim 13, wherein said restore procedure is invoked by refresh procedure.

15. The method according to claim 13, wherein said non erasable part of the storage is a ROM memory module.

16. The method according to claim 13, wherein said applications are at least one of the following:

Secure logging, Secure end-to-end communication, Timestamping, Certificate authority, Key recovery, Voting, Trading, Database, Operating system, Access control mechanisms, Secure Commerce.

17. The method according to claim 13, wherein said restore related information includes restore related self information.

18. The method according to claim 13, wherein said restore related information includes restore related others' information.

19. The method according to claim 17, wherein said restore related self information includes $M_I = S^I_{Start}(V_{Cert}, C)$.

20. The method according to claim 18, wherein said restore related others' information includes $(S_{Cert}(M), M)$.

21. The method according to claim 13, wherein said initialization procedure includes:

(i) receiving at least configuration data C, public non-proactive related key $V^I_{start}$ and discardable one time private key $S^I_{start}$;

(ii) generating a set of keys $S_f(0)$, $V_f(0)$, $E_f(0)$, $D_f(0)$;

(iii) broadcasting said set of keys except $D_f(0)$ over the network to the rest of the servers (1 ... i−1, i+1, ... n) in the group, so as to authenticate and encrypt the network channel;

(iv) generating the group public proactive key $V_{Cert}$ and a share ($S^I$ CERT) of corresponding private proactive key $S_{CERT}$;

(v) generating restore related self information that includes $M_I = S^I_{Start}(V_{Cert}, C)$;

(vi) discarding the one-time private key $S^I_{Start}$;

(vii) broadcasting $M_I$ to all servers in the group, and receiving $M_J$ from all respective $SP_J$ servers in the group; the processor concatenating said $M_1 \ldots M_N$ so as to construct M;

(viii) generating a joint signature ($S_{Cert}(M), M$) that forms part of said restore related others' information; and (ix) broadcasting the joint signature ($S_{Cert}(M), M$).

22. The method according to claim 13, wherein said restore procedure includes:

(i) extracting $V^I_{Start}$;

(ii) extracting $M_I$ from M;

(iii) constructing $V_{Cert}$ by applying $V^I_{Start}$ to $M_I$;

(iv) validating M by applying $V_{CERT}$ to the joint signature part $S_{Cert}(M)$; if the result matches M then the server becomes operational; sending M and $S_{Cert}(M)$ to all the group servers;

(v) if, on the other hand, M is invalid, then waiting the receipt of another joint signature and in response repeating said (ii) to (iv).

23. A storage medium storing computer implemented program for providing a proactive security in proactive operating environment; the proactive operating environment includes a group of proactive servers communicating over a network; the method comprising performing the following in respect of each proactive server ($PS_I$):

storing in a non erasable part at least a public, non proactive related, key $V^I_{Start}$;

storing in an erasable part private and public data;

providing a discardable one-time private key $S^I_{Start}$ that corresponds to said public key $V^I_{Start}$;

providing configuration data C;

providing at least proactive services to applications;

providing a group public proactive key $V_{CERT}$ of a corresponding private proactive key $S_{CERT}$;

invoking an initialization procedure for generating restore related information; and invoking a restore procedure for utilizing at least said public, non proactive related, key $V^I_{Start}$ and said restore related information for restoring at least said public proactive key $V_{CERT}$.

\* \* \* \* \*